United States Patent
Agnihotri et al.

(10) Patent No.: US 7,762,501 B2
(45) Date of Patent: Jul. 27, 2010

(54) METHOD AND APPARATUS FOR IMPROVING MAIN ROTOR YOKE FATIGUE LIFE

(75) Inventors: Ashok Agnihotri, Southlake, TX (US);
Helmuth Koelzer, Hurst, TX (US);
John Schillings, Fort Worth, TX (US);
Robert Fortenbaugh, Pantego, TX (US)

(73) Assignee: Bell Helicopter Textron Inc., Hurst, TX (US)

( * ) Notice: Subject to any disclaimer, the term of this patent is extended or adjusted under 35 U.S.C. 154(b) by 703 days.

(21) Appl. No.: 11/215,317

(22) Filed: Aug. 31, 2005

(65) Prior Publication Data

US 2007/0050099 A1    Mar. 1, 2007

(51) Int. Cl.
*B64C 13/04* (2006.01)

(52) U.S. Cl. ........................... 244/220

(58) Field of Classification Search ........... 244/17.13, 244/17.25, 76 R, 178, 220
See application file for complete search history.

(56) References Cited

U.S. PATENT DOCUMENTS

| | | | | |
|---|---|---|---|---|
| 4,032,083 A | * | 6/1977 | Maciolek | 244/17.13 |
| 4,168,045 A | * | 9/1979 | Wright et al. | 244/17.13 |
| 4,267,987 A | * | 5/1981 | McDonnell | 244/2 |
| 4,304,375 A | * | 12/1981 | Builta et al. | 244/17.13 |
| 4,580,223 A | * | 4/1986 | Wright et al. | 701/12 |
| 4,607,201 A | * | 8/1986 | Koenig | 318/584 |
| 5,001,646 A | * | 3/1991 | Caldwell et al. | 701/7 |
| 5,751,609 A | * | 5/1998 | Schaefer et al. | 702/144 |
| 6,592,071 B2 | * | 7/2003 | Kinkead et al. | 244/7 R |

FOREIGN PATENT DOCUMENTS

GB    2 050 980    1/1981

OTHER PUBLICATIONS

International Search Report issued in PCT/US2006/025741, dated Sep. 26, 2007, 3 pages.
Written Opinion of the International Search Authority in PCT/US2006/025741, dated Sep. 26, 2007, 7 pages.

* cited by examiner

*Primary Examiner*—Timothy D Collins
*Assistant Examiner*—Valentina Xavier
(74) *Attorney, Agent, or Firm*—Pillsbury Winthrop Shaw Pittman LLP

(57) ABSTRACT

A method and system for optimizing rotor flapping utilizes the collective stick position and true airspeed to determine a commanded longitudinal stick position.

13 Claims, 3 Drawing Sheets

Table 1.

| Rotorcraft Usage Spectrum Per 100 Flight Hours ||
| Regime | Occurrences |
|---|---|
| Pushovers: | |
| 0.50g | 9.85 |
| 0.25g | 4.92 |
| 0% Negative Limit Load Factor | 0.11 |
| -10% Negative Limit Load Factor | 0.08 |
| -20% Negative Limit Load Factor | 0.04 |
| Pullouts: | |
| 45% Positive Limit Load Factor | 500 |
| 55% Positive Limit Load Factor | 150 |
| 65% Positive Limit Load Factor | 50 |
| 75% Positive Limit Load Factor | 15 |
| 85% Positive Limit Load Factor | 2.5 |
| 90% Positive Limit Load Factor | 2.5 |
| 95% Positive Limit Load Factor | 1.5 |
| 105% Positive Limit Load Factor | 0.77 |

Figure 2.

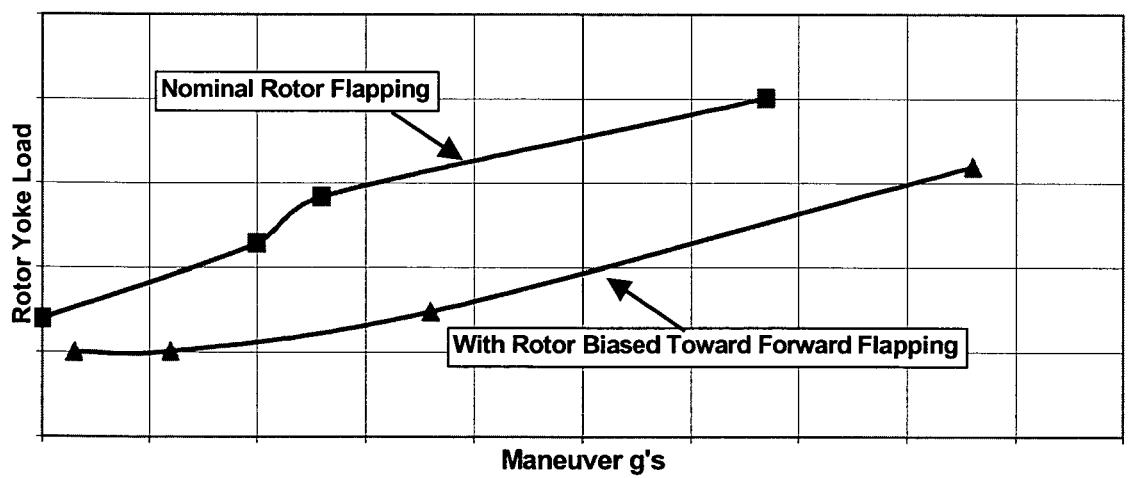

Figure 3.

METHOD AND APPARATUS FOR IMPROVING MAIN ROTOR YOKE FATIGUE LIFE

GOVERNMENT RIGHTS

This invention was made with Government support under Contract No. N00019-96-0128 awarded by the Department of the Navy. The Government has certain rights in this invention.

SUMMARY

It is known in the rotorcraft industry that excessive flapping of rotors, such as rotors used in a flex beam system, may severely shorten the life of the rotor yoke.

While bending flexure of rotors is required for optimized flight control, it is desirable to achieve such control without unnecessarily shortening the yoke life, as yokes are extremely expensive components to replace. As shown in FIG. 1, it has been determined that small reductions in oscillatory yoke loads can lead to profound increases in yoke life. That is, the effect of accumulated oscillatory load on yoke life is a logarithmic function. Thus, even a 10% decrease in average yoke load would increase the life of the yoke by approximately five times.

The present invention stems from a recognition that most damage to the yoke occurs during maneuvers, as opposed to during trimmed flight at a normal load factor of 1.0 g where typically no yoke fatigue damage is incurred. In particular, most damage occurs during aircraft pull-up maneuvers where the load factor is increasing above 1.0 g, since such types of pilot maneuvers typically involve the most significant and most frequent bending load applications on the rotor. Table 1 presents the usage spectrum for an example rotorcraft. As seen in the table, the pullout maneuvers per 100 flight hours greatly outnumber the pushover maneuvers. If the example rotorcraft has a positive limit load factor of 3.5 g and a negative limit load factor of −0.5 g, the number of pullout maneuvers resulting in a normal load factor of approximately 2.0 g, or an increase of 1.0 g, would be 150 per 100 flight hours. Whereas the number of pushover maneuvers resulting in 0.0 g, or a decrease of 1.0 g, is less than one per 100 flight hours.

For a given rotor system with a composite yoke, there is typically a range of flapping angles that the rotor can sustain with unlimited fatigue life. This endurance limit applies to the magnitude of the rotor flapping and not its direction or orientation. Longitudinal flapping is normally the larger contributor to the overall flapping in a helicopter rotor system in forward flight. However, depending on the flight condition and the location of the center of gravity of the helicopter, the flapping may be in the forward or aft direction. In instances where the helicopter is trimmed with aft flapping (front edge of the rotor flaps upward), the effect of a pull-up maneuver is most severe. That is, when the helicopter is trimmed with aft rotor flapping, the rotor system is already operating in a state that is biased toward the aft flapping endurance limit. When a pull-up maneuver is then executed with the rotor biased in the aft flapping direction, the rotor flapping loads become severely damaging as the flapping exceeds the endurance limit.

By contrast, with the rotor biased toward the forward flapping endurance limit for the same starting trim condition, the same pull-up maneuver will generate much lower yoke loads as shown in FIG. 3. Biasing the rotor flapping toward the forward endurance limit provides a cushion for the rotor flapping to migrate in the aft direction during the pull-up maneuver before approaching or exceeding the flapping endurance limit due to the aft flapping generated by the maneuver. As a result, the amount of time the rotor spends operating within the endurance limits of the yoke is dramatically increased and exceedances of the endurance limits are greatly reduced in magnitude and frequency.

The longitudinal cyclic control position, pitch attitude, and rotor flapping state for trimmed, 1-g flight conditions vary depending on the weight, center of gravity, altitude, and airspeed of the rotorcraft.

As an example, the tendency may exist for an aircraft to trim with an undesirable nose-high attitude when the center of gravity of the aircraft is near the aft portion of its allowable range.

The present invention advantageously allows the helicopter to be automatically trimmed toward the same desired trim position. In one embodiment, the rotor flapping of a helicopter is automatically trimmed toward the forward flapping endurance limit in order to decrease damaging yoke loads during pull-up maneuvers and increase overall yoke life. The automatic trimming is accomplished by adjusting the elevator incidence angle based upon a feedback of measured aircraft parameters. The measured aircraft parameters are indicators of the flapping state of the rotor and are compared to target values that will provide an optimum flapping state of the rotor.

BRIEF DESCRIPTION OF THE DRAWINGS

FIG. 2 is a table that presents a usage spectrum for an example rotorcraft.

FIG. 3 is a graph that plots rotor yoke load against g-force for various maneuvers, for nominal rotor flapping and with the rotor biased towards forward flapping.

DETAILED DESCRIPTION OF THE PREFERRED EMBODIMENTS

It should be appreciated that efficient and reliable measurement of the flapping state of a rotor is difficult to accomplish. However, it is known that rotor flapping is comprised of two components. The first component is a function of the thrust coefficient, $C_T$, and the advance ratio, $\mu$, of the rotor. $C_T$ is a function of the rotor collective control position, and $\mu$ is a function of the airspeed of the helicopter. The second flapping component is a function of the cyclic control input to the rotor, primarily longitudinal cyclic. Therefore, total rotor flapping can be accurately approximated using the longitudinal cyclic input, the collective position, and the measured (true) airspeed. Advantageously, these three parameters are readily available parameters that are measured in most rotorcraft.

In one embodiment, transducers or encoders are used to measure the longitudinal cyclic and collective control positions. In addition, an airspeed transducer can be used to measure the airspeed of the helicopter. Thus, the flapping state can be determined and controlled by these parameters.

Figure 1:
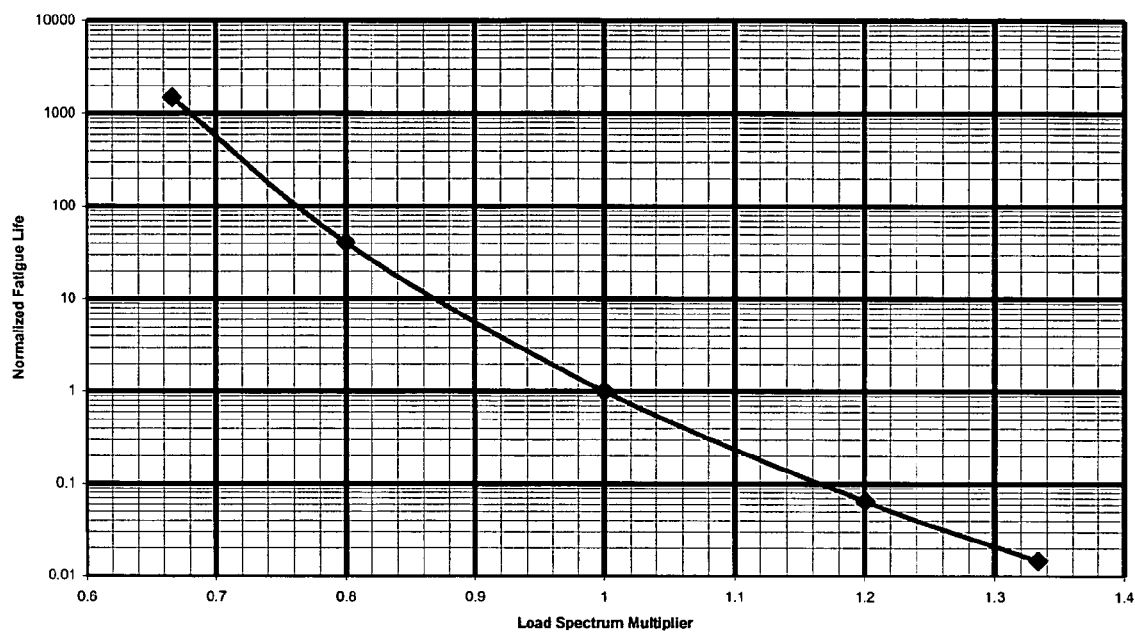
FIG. 1 is a graph showing the effect of rotor load on rotor fatigue life.
Figure 4:
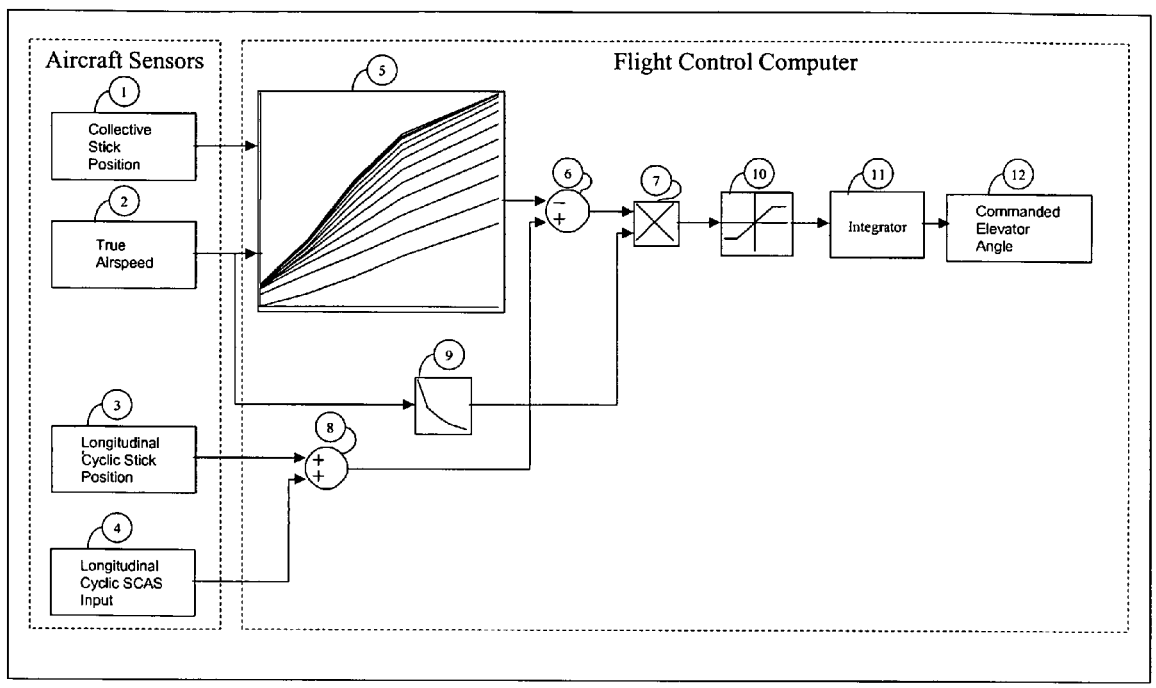
FIG. 4 is a schematic representation of the method and system employed in accordance with one embodiment of the present invention.

Based on the algorithm employed in accordance with the present invention, the elevator incidence is controlled according to the control law diagram in FIG. 4. The measured collective stick position (1) and true airspeed (2) are applied to a 2-D table look-up function (5). The measured collective stick position (1), which is controlled/positioned by the pilot, is measured with a potentiometer (or other similar device) to provide an electric signal to the flight control computer that is proportional to the displacement of the collective stick. The measured collective stick position is a measurement of aircraft thrust (the thrust coefficient). The true airspeed (2), which (as known in the art) is the relative speed between the aircraft and the air, is measured as a signal from the airspeed transducers (such as a pitot-static system, LAADS computer, or other similar device) that process the calculation of true airspeed for use in the flight control computer.

In order to control and/or reduce rotor flapping, it is desirable to first measure such flapping. However, direct measurement of rotor flapping has proven to be problematic, inaccurate, expensive, and thus impractical. In accordance with one aspect of the present invention, the inventors have recognized that a physical relationship exists between rotor flapping, the longitudinal cyclic input, collective control input, and true airspeed, as will be described.

Total rotor flapping is essentially made up of two components. One component of rotor flapping is due to the collective input to the rotor and the airspeed of the aircraft and is determined by the flight condition of the rotorcraft. This component can be determined by analysis and verified through flight test data. The second component of flapping is due to the cyclic control inputs to the rotor. The sum of the two components defines the total flapping state of the rotor. One aspect of this invention is to control total rotor flapping, which is a known value. Since the flapping component due to collective position and airspeed is determined by the flight condition of the rotorcraft, the flapping component due to the longitudinal cyclic input to the rotor can essentially be determined so that the sum of the two components equals the target flapping value. The resulting commanded longitudinally cyclic position can be determined for all combinations of collective position and airspeed. In effect, the commanded longitudinal cyclic position can be determined so that the target flapping value is satisfied for all flight conditions. As a result, actual longitudinal cyclic input to the rotor can be forced to match the commanded longitudinal stick position (X) to control rotor flapping.

Thus, the collective stick position (1) and true airspeed (2) can be used to determine the commanded longitudinal stick position, and thus be used in combination with the actual longitudinal stick position (Y) to indirectly measure rotor flapping. More specifically, in accordance with one aspect of the invention, a 2-D table look-up function (5) is utilized to derive a commanded longitudinal cyclic stick position (X), based upon input signals representative of the collective stick position (1) and true airspeed (2). The commanded longitudinal cyclic stick position (X) can be considered a desired or ideal longitudinal stick position, for simultaneously achieving both target flapping and high static stability. The 2-D look up-table (5) is comprised of data that is established by flight test simulation and analysis, flight test data mapping, and verification.

The measured actual longitudinal cyclic stick position (3), which is controlled/positioned by the pilot, and the longitudinal stability and control augmentation system (SCAS), which is input to the rotor (4) by the flight control system, are applied to a summation unit (8) to determine the total or actual longitudinal cyclic input to the aircraft rotor. The measured longitudinal cyclic stick position (3) is measured with a potentiometer (or other similar device) to change an electric signal to the flight control computer that is proportional to the displacement of the longitudinal cyclic stick. The longitudinal cyclic SCAS input is measured with a potentiometer (or other similar device) to change an electric signal to the flight control computer that is proportional to the displacement of the longitudinal cyclic SCAS actuators.

The output signal from the summation unit (8) and the output from the 2-D table look-up function (5) are then applied to a subtraction unit (6). The signal output of the subtraction unit (6) is the error (Z) between the commanded longitudinal cyclic position and the actual longitudinal cyclic input. This signal error (Z) in the longitudinal stick position is applied to a signal multiplier (7), which provides a gain on the error. The aerodynamic effectiveness of the elevator is directly proportional to airspeed. As airspeed increases, the elevator becomes more effective and requires less incidence change to eliminate a given error in longitudinal cyclic position. Therefore, the measured true airspeed (2) is applied to a 1-D table look-up function (9). The output from the 1-D table look-up function (9) represents a gain or scaling factor to be applied to the longitudinal cyclic error by means of the signal multiplier (7). The magnitude of the gain decreases with increasing airspeed, which results in a reduced elevator rate at higher speeds for a given longitudinal cyclic position error.

The output of the signal multiplier (7) may be considered the desired rate of elevator movement. This output from signal multiplier (7) is provided to a signal limiter (10) to control or limit the rate of movement of the elevator and thus prevent overdisturbance of the aircraft.

The output of the signal limiter (10) is supplied to an integrator (11). The integrator (11) continues to integrate the command and move the elevator until the error (Z) in the longitudinal cyclic stick position is sufficiently reduced (e.g., reaches zero or substantially zero). In other words, the elevator incidence is adjusted until the longitudinal cyclic error is eliminated and the desired rotor flapping state is achieved. The output of the integrator (11) is a commanded elevator incidence angle (12). This methodology provides the ability to bias the rotor flapping toward the forward endurance limit to allow for aft flapping during pull-up maneuvers with little or no damage to the yoke.

In a different embodiment, the helicopter is automatically trimmed to a different desired trim attitude. For example, the helicopter can be automatically trimmed so that the helicopter pitch attitude is always level. To do this, the longitudinal cyclic error is replaced by pitch attitude error, or the difference between the actual pitch attitude of the aircraft and the desired pitch attitude.

In another embodiment, the helicopter can be automatically trimmed so that the helicopter is always at a select pitch attitude (e.g., always 5° nose down) for better visibility for certain helicopter functions (e.g., attack functions). In another embodiment, a canard or the mast tilt of the rotorcraft can be used to adjust the pitching moment of the aircraft to achieve the desired rotor flapping or pitch attitude.

The present invention achieves the benefits noted above, while at the same time provides the ability to explicitly define the longitudinal static stability of the aircraft. The control algorithm implemented in this invention determines the desired longitudinal cyclic position as a function of measured collective control position and airspeed. As a result, the algorithm defines the longitudinal cyclic gradient versus airspeed for a given collective setting, which is the definition of static longitudinal stability. This benefit can be realized while maintaining positive attitude stability of the aircraft.

What is claimed is:

1. A method for trimming a rotor-craft to a target flapping without measuring rotor flapping, the method comprising:
 a) providing a predetermined target flapping trim state,
 b) determining a collective control stick position,
 c) determining air speed of the rotor-craft, d) using a), b), and c) to determine a desired longitudinal cyclic stick position for trimmed flight, and e) moving a control surface of the rotor-craft to change a rotor-craft pitching moment until an error between an actual longitudinal cyclic stick position and the desired longitudinal cyclic stick position is substantially zero.

2. The method according to claim 1, wherein the predetermined target flapping trim state is a forward flapping trim state, which results in the rotor flapping being biased toward a forward flapping position, thereby providing a cushion for the rotor flapping to migrate in aft direction during pull-up maneuvers before approaching or exceeding a flapping endurance limit due to aft flapping generated by the maneuver.

3. The method according to claim 1, wherein the control surface is provided by a rotor-craft elevator structure.

4. The method according to claim 1, further comprising use of a stability and control augmentation system (SCAS) to generate a longitudinal cyclic signal that is also used to control the control surface.

5. The method according to claim 4, wherein the signal generated by the SCAS is used in conjunction with a measured longitudinal cyclic position of a cyclic control stick to derive the actual longitudinal cyclic stick position.

6. The method according to claim 1, further comprising scaling the error with airspeed by multiplying the error by a gain that is a function of air speed to obtain a scaled error.

7. The method according to claim 6, further comprising limiting the magnitude of the scaled error to obtain a scaled and limited error.

8. The method according to claim 7, further comprising integrating the scaled and limited error.

9. The method according to claim 8, further comprising continuing to integrate the limited error signal until the magnitude of the error is reduced to a predetermined level.

10. The method according to claim 9, wherein the magnitude of the error is reduced to zero.

11. The method according to claim 9, wherein the output of the integrated error is a commanded elevator incidence angle, which is used to control the rotor flapping of the rotor-craft.

12. The method of claim 1, further comprising determining a longitudinal static stability of the rotor-craft by determining a longitudinal cyclic gradient versus airspeed for a given collective setting.

13. The method of claim 12, wherein the longitudinal static stability has a positive value.

* * * * *